Aug. 26, 1958     A. J. DOUMONT     2,848,845
APPARATUS FOR IMPROVING LEHR OPERATION

Filed March 12, 1954     2 Sheets-Sheet 1

INVENTOR.
ARMAND J. DOUMONT
BY
Oscar L. Spencer
ATTORNEY

INVENTOR.
ARMAND J. DOUMONT
BY
Oscar L. Spencer
ATTORNEY

United States Patent Office 2,848,845
Patented Aug. 26, 1958

2,848,845
APPARATUS FOR IMPROVING LEHR OPERATION

Armand J. Doumont, Tarentum, Pa., assignor to Pittsburgh Plate Glass Company, Allegheny County, Pa., a corporation of Pennsylvania Application March 12, 1954, Serial No. 415,890

3 Claims. (Cl. 49—47)

The present invention relates to an apparatus for improving lehr operation and is particularly concerned with the reduction of losses in rough rolled glass during its passage through an annealing lehr where newly formed hot, rough rolled glass is cooled controllably in order to relieve internal stresses present in the glass as much as possible.

During the fabrication of plate glass, after the glass has been manufactured by melting batch ingredients in a melting tank, it is formed in the shape of a continuous sheet or ribbon and the sheet of rough rolled glass is introduced into an annealing lehr where the glass is controllably cooled. The ribbon of glass is introduced into one end of the lehr at a high temperature and conveyed by means of a plurality of driven rollers which transport the glass sheet through the lehr. Additional rolls convey the glass ribbon from the exit end of the lehr, where the glass is inspected prior to cutting, grinding, polishing and other operations.

The continuous sheet of glass introduced into the lehr has many vents in its surfaces. These vents frequently develop into fissures or cracks in the glass while the glass is conveyed through the lehr. Frequently, these fissures follow the path of least resistance in the glass and develop into longitudinal splits centrally of the glass in the general direction of movement of the glass through the lehr.

These longitudinal splits tend to continue indefinitely unless some steps are taken to veer the longitudinal splits to an edge of the glass sheet as the latter is moving through the lehr. By raising the edge of the moving sheet closer to the longitudinal split behind the rear end of the split, this veering of the split is accomplished and a section of glass is split away from the main glass sheet.

Unless this split section thus formed is removed from the lehr more rapidly than the main sheet, the latter repeatedly bumps against the split portion, thus causing additional vents to form. These additional vents, in turn, develop into additional longitudinal splits resulting in loss of rough rolled plate glass.

The present invention includes means for automatically separating the broken portions of glass ribbon which must be separated from the main body of the glass in order to minimize the loss due to breakage. This has been accomplished by providing a series of high speed rolls at the cool end of the lehr for accelerating the removal of glass portions detached from the main body of glass. The provision of these high speed rolls speeds up the motion of the detached glass sections ahead of the main body of glass and maintains these portions separated from the main sheet of glass. This series of rolls may be speeded up when desired or, preferably, may be maintained at higher rotational velocities than the other supporting rolls for the conveyor which conveys the glass ribbon through the annealing lehr. The provision of high speed rolls at the cool end of the annealing lehr has resulted in a lessening of losses in square feet of rough rolled glass due to breakage in the lehr of between 90% and 95%.

I have determined that the location of these higher speed conveyor rolls for separating the split glass portions from the main ribbon is very important. These rolls, if rotated at a uniformly high speed, rub against the under surface of a main glass ribbon whenever the latter is free from splits. Unless the glass has hardened sufficiently before its surface is rubbed by the high speed rolls, surface mars are produced, thus increasing the difficulties encountered in the subsequent grinding and polishing of the glass. Therefore, it is essential that the glass be at its coolest possible lehr temperature before the under surface of the ribbon is rubbed by the high speed rolls. This requirement necessitates placing the high speed rolls adjacent the exit end of the annealing lehr.

Accordingly, it is an object of the present invention to provide an apparatus in an annealing lehr for minimizing the losses of rough rolled glass therein due to glass breakage.

Another object of the present invention is to provide apparatus in an annealing lehr that does not affect a continuous glass ribbon, but which accelerates the rate of removal of glass fragments so that the latter may clear the lehr in advance of the main glass ribbon, thereby minimizing breakage losses due to repeated abutment of the main glass ribbon against glass fragments in advance of the ribbon.

These and other objects of the present invention will be more fully understood upon study of the accompanying description taken in conjunction with the accompanying drawings.

Figure 1:
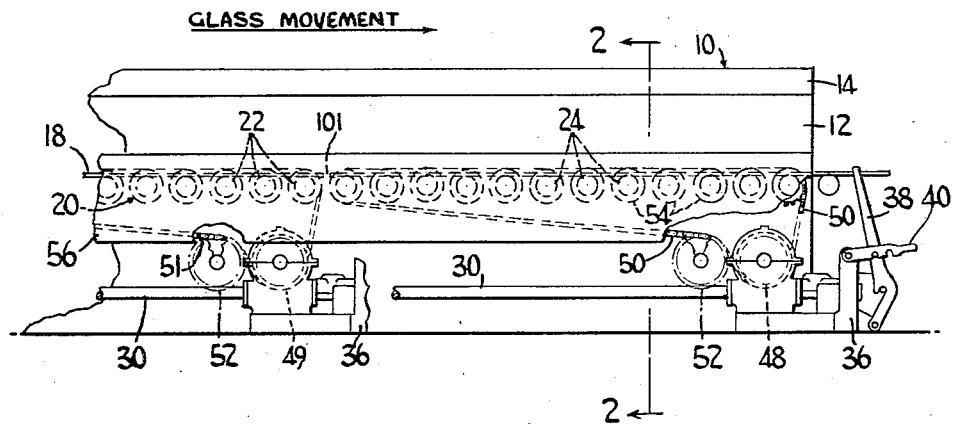
Figure 1 is a side elevation of the exit portion of an annealing lehr with portions broken away to show certain details.
Figure 2:
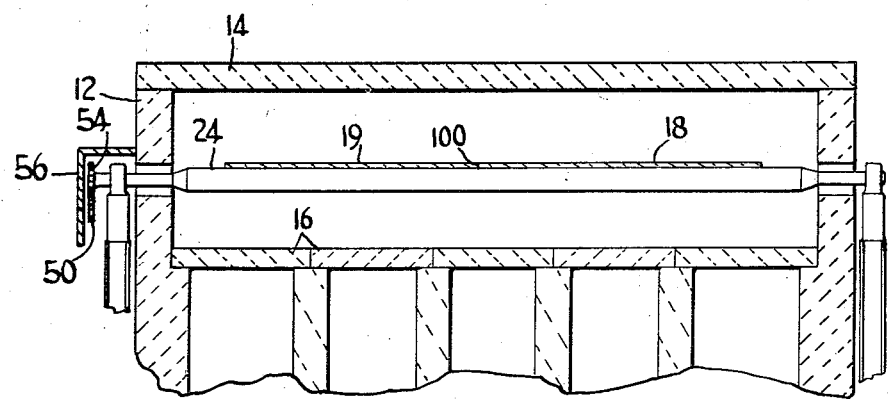
Figure 2 is a cross-sectional view along the lines 2—2 of Figure 1.
Figure 3:
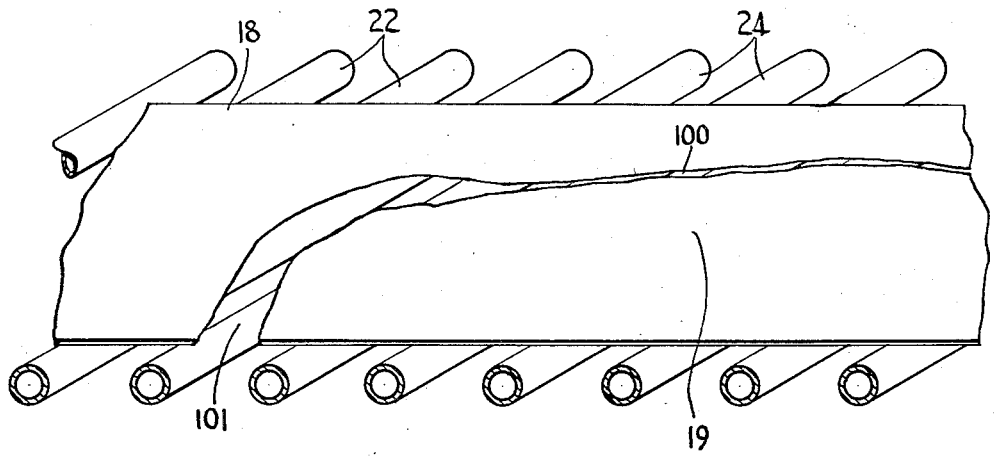
Figure 3 is an isometric view of a portion of the apparatus with certain details removed to point out the particularities of the present invention.
Figure 4:
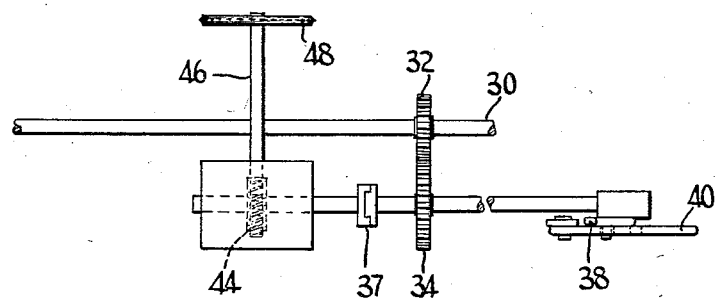
Figure 4 is a schematic sketch showing the interrelation of various drive mechanisms used in conjunction with a section of a lehr conveyor.

Referring to the drawings, an annealing lehr 10 is shown comprising a side wall 12, roof portion 14 and a floor portion 16. A sheet of glass 18 is conveyed through the lehr by means of a roller conveyor 20 comprising a plurality of sections of rolls 22 rotating at a desired speed about axes athwart the lehr. These rolls support the glass and impart a forwarding motion to the ribbon by virtue of their rotation. Adjacent the exit end of the lehr is a set of rolls 24 rotating at a higher speed than the remainder of conveyor rolls 22. This set of high speed rolls is preferably the very last set supporting the glass within the lehr housing so that the glass ribbon is at the lowest possible temperature when supported and conveyed by this set of high speed rolls.

Rolls 22 and 24 are provided with smooth surfaces to enable some sliding to be effected between the glass ribbon and the rolls. Yet, the weight of the glass is sufficient to provide enough frictional engagement between its under surface and the rolls for the rolls 24 to impart a faster forward motion to the split section than the motion imparted to the main glass ribbon by its frictional engagement with the other conveyor rolls 22. The location of the higher speed rolls 24 is preferred at the cool or exit end of the lehr because the glass ribbon is at its lowest lehr temperature in this location. When the glass ribbon is free from breaks, the cooler it is when the higher speed rolls 24 slidably engage its under surface, the less is the roughness imparted to the slidably engaged glass surface by this sliding action.

The conveyor rolls 22 and 24 are all rotated from a main drive shaft 30 that extends the length of the lehr. At spaced intervals along the main drive shaft are tooth gears 32 which rotate about the axis defined by the main drive shaft. A tooth gear 32 is provided for each set of conveyor rolls.

Another gear 34 is brought into engagement with each spaced gear 32 within a gear box 36 by means of a clutch mechanism 37 comprising a clutch arm 38 and a rotatable latch 40 which locks the clutch into one of a plurality of positions wherein the gears 32 and 34 are either meshed or out of engagement. Thus, each section of the conveyor may be clutch controlled individually. Gear 34 is connected by a drive shaft 42, reducer worm gearing 44 and shaft 46 to a drive sprocket 48. The latter drives a chain 50 which is meshed with a series of sprocket members 54. Each sprocket member is fixed to a conveyor roll 22 or 24 via a rotatable shaft which rotates between bearing housings.

The section containing the higher speed rollers 24 is made to rotate at the higher speeds by providing the sprocket 48 with a slightly larger periphery and one more tooth than corresponding sprockets 49 contained in the sections provided with the standard speed conveyor rolls 22. Since sprockets 48 and 49 have the same rotational speeds in revolutions per minute, the provision of an additional tooth in sprocket 48 causes chain drive 50 of the speed-up section to move more rapidly than the chain drives 51 of the standard speed sections. Since each roller 22 and 24 is rotated with its individual sprocket 54 engaged by chain drive 50 or 51, it is readily apparent why the conveyor rolls 24 rotate at a higher velocity than rolls 22.

Idler sprockets 52 are provided to maintain the proper tension in the various chain drives. Also, it is preferable that a flanged apron 56 of metal be provided as a safety precaution to cover the exposed moving parts of the various chain drives.

If a portion of glass ribbon 19 has a longitudinal split 100, the split will continue to run longitudinally unless this split portion 19 is removed from the main glass ribbon 18 by veering the split transversely as at 101.

Figure 5:
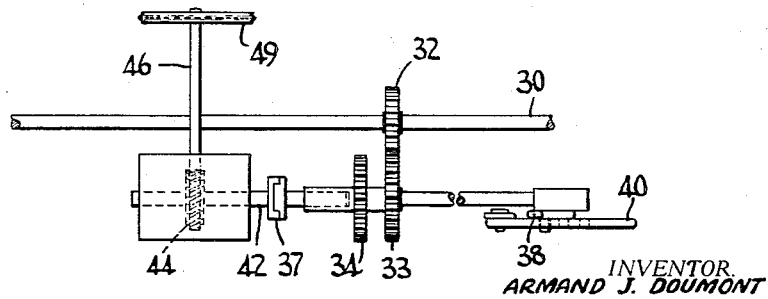
Figure 5 is a schematic sketch showing the interrelation of various drive mechanisms used in conjunction with an alternate embodiment of a section such as shown in Figure 4.

Instead of substituting a larger sprocket 48 in the high speed section for the sprockets 49 in the other sections, an additional conventional sprocket 49 could be used in the high speed section and the clutch mechanism be provided with means for optionally engaging a gear 33 that imparts a higher speed to the chain drive than gear 34 whenever a transverse break of the glass ribbon is effected to part a split portion from the main body of glass (see Figure 5). In this embodiment, the rolls in the high speed section are normally rotated at the same rotational speed as the other rolls until a split occurs. When the split section is separated from the main glass ribbon, the gear 34 is disengaged and gear 33 meshed with gear 32, thereby accelerating the rotation of the rolls in the speed-up section.

In the present application, the terms "lehr" and "annealing lehr" are limited to that portion of apparatus for manufacturing polished plate glass where the glass is intended to be transported and cooled in the form of a continuous ribbon prior to being inspected and cut into sizes suitable for subsequent surfacing operations.

Certain particular embodiments of an apparatus capable of minimizing glass breakage within a lehr by removing a split portion from the lehr more rapidly than the main glass ribbon is conveyed through the lehr have been described as required by the patent statutes. The particular embodiments described in detail are for purposes of illustration rather than limitation.

What is claimed is:

1. Apparatus for conveying a continuous ribbon of glass through a substantially horizontally disposed annealing lehr and rapidly removing split sections of said ribbon from the lehr comprising, a plurality of rolls positioned adjacent and within the entrance end of said lehr for supporting and conveying said ribbon therethrough means for rotating said plurality of rolls at a predetermined speed, additional rolls positioned adjacent and within the exit end of said lehr for rapidly removing said split sections of said ribbon from said lehr, and means for rotating said additional rolls at a speed in excess of said predetermined speed.

2. Apparatus for conveying a continuous ribbon of glass through a substantially horizontally disposed annealing lehr and rapidly removing split sections of said ribbon from the lehr comprising, a plurality of rolls positioned adjacent and within the entrance end of said lehr for supporting and conveying said ribbon therethrough, means for rotating said plurality of rolls at a predetermined speed, additional rolls positioned adjacent and within the exit end of said lehr positioned for continuous contact with said ribbon and for rapidly removing said split sections of said ribbon from said lehr, and means for rotating said additional rolls at a speed in excess of said predetermined speed.

3. Apparatus for conveying a continuous ribbon of glass through a substantially horizontally disposed annealing lehr and rapidly removing split sections of said ribbon from the lehr comprising, a plurality of rolls positioned within said lehr for supporting and conveying said ribbon therethrough, means for rotating said plurality of rolls at a predetermined speed, additional rolls positioned adjacent and within the exit end of said lehr for rapidly removing said split sections of said ribbon from said lehr, and means for rotating said additional rolls at a speed in excess of said predetermined speed.

References Cited in the file of this patent

UNITED STATES PATENTS

| 1,674,794 | Peiler | June 26, 1928 |
| 1,683,973 | Heichert | Sept. 11, 1928 |
| 1,728,538 | Gentil et al. | Sept. 17, 1929 |
| 1,761,199 | Drake | June 3, 1930 |
| 1,792,653 | Moxley | Feb. 17, 1931 |
| 1,834,120 | Callard et al. | Dec. 1, 1931 |
| 1,879,998 | Sylvester | Sept. 27, 1932 |
| 2,235,359 | Curry et al. | Mar. 18, 1941 |